Nov. 25, 1930.  D. W. SMITH ET AL  1,782,586
BINDER HITCH
Filed May 18, 1927  2 Sheets-Sheet 1

Inventor
D.W. Smith
W. Webber
By
Atty

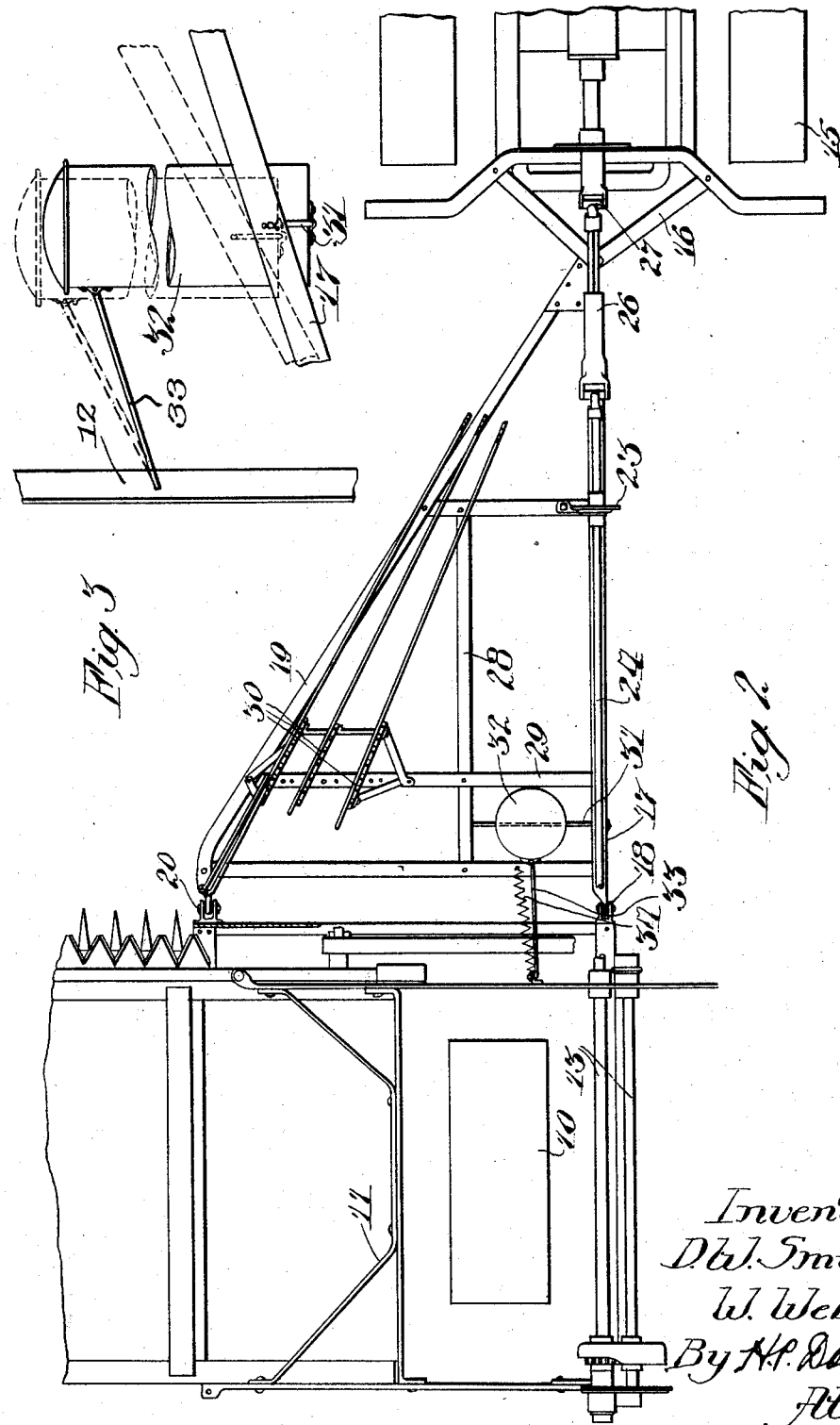

Patented Nov. 25, 1930

1,782,586

UNITED STATES PATENT OFFICE

DANIEL W. SMITH, OF OAK PARK, AND WILLIAM WEBBER, OF LA GRANGE, ILLINOIS, ASSIGNORS TO INTERNATIONAL HARVESTER COMPANY, A CORPORATION OF NEW JERSEY

BINDER HITCH

Application filed May 18, 1927. Serial No. 192,193.

This invention is in the art of harvesting machinery and relates especially to an improved hitch structure for a binder.

It is common practice at this time to employ tractors for pulling such machines as grain binders. This necessitates the use of a tractor hitch structure, and, as these outfits are designed for one-man control from the seat of the tractor, it is desirable that all the binder control levers and other parts which require the operator's supervision be in such a position that they may be watched and also be easily controlled. Further, when the binder is not in use, it is desirable that the hitch structure be foldable so as to narrow the width of the machine for allowing its passage through narrow places such as gateways, for example.

With these general thoughts in mind, the main objects of this invention are to provide an improved foldable hitch structure for a grain binder; to provide a novel twine can mounting associated with such hitch structure; and, lastly, to provide counterbalancing means for the hitch structure.

Other objects, of course, should be apparent to those skilled in this art as the present disclosure progresses.

Briefly, these desirable objects are achieved in the combination with a binder having a main frame, of a hitch comprising a draw frame pivotally connected to the binder main frame on horizontal pivots so as to adapt this hitch frame for upward folding, there being a counterbalance means between the binder frame and the hitch frame to exert a force for assisting this folding action. This hitch frame carries the various binder control levers and also a vertically disposed twine can mounted in such a manner that, as the hitch frame is folded, the twine can will at all times maintain its vertical position. The forward end of the hitch frame is adapted for pivotal connection on a vertical pivot to the drawbar of a tractor. This brief description will suffice in giving a general view of the structure involved.

In the accompanying sheets of drawings,—

Figure 2 is a plan view of the same structure; and

Figure 3 is a detail side elevational view illustrating the twine can mounting.

Figure 1:
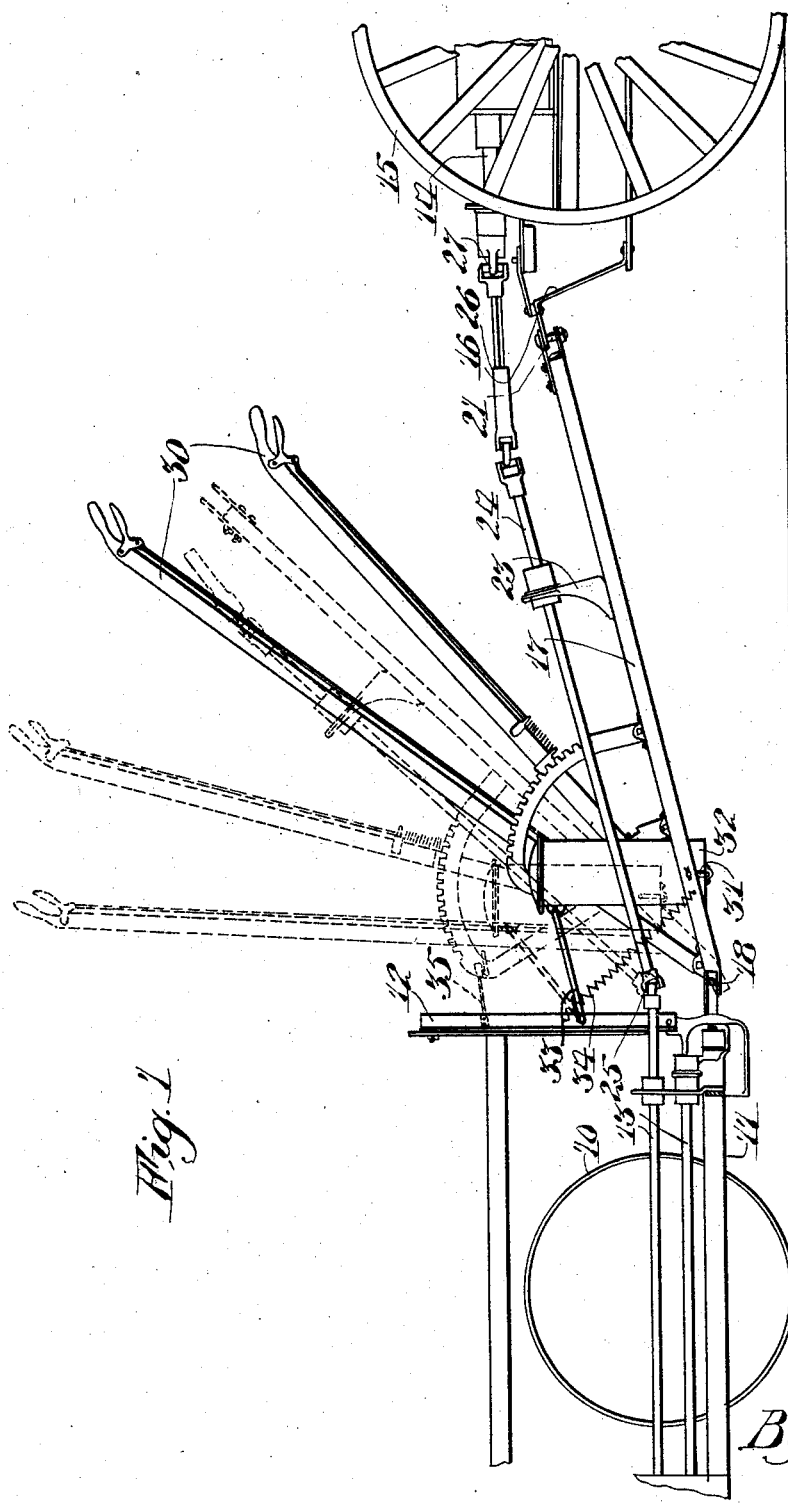
Figure 1 is a general side elevational view of a tractor drawn grain binder, showing the improved hitch structure.

The grain binder shown embodies a main carrying wheel 10, which supports in any approved manner, the binder main frame 11 including an upright post 12. Carried on the binder frame are shafts 13 adapted to be driven from the power take-off shaft 14 of a tractor 15 having a drawbar 16, as will later be more specifically set forth.

An improved hitch is provided for connecting the binder main frame to the tractor drawbar 16. This will now be described. As shown in the drawings, the improved binder hitch comprises a forwardly extending member 17 pivotally connected on a horizontal pivot 18 to the main frame 11 of the binder and another member 19 connected on a horizontal pivot 20 to the binder main frame at a point spaced grainwardly from the pivot 18. The two pivots 18 and 20 are in lateral alinement and the members 17 and 19 converge forwardly where they are connected by a vertical pin 21 pivotally to the draw element 16. Forwardly of the pivots 18 and 20, the members 17 and 19 are connected by a cross member 22. It will thus be seen that the members 17, 19, and 22 form a triangle constituting the draw frame of the hitch.

The member 17 carries an upright bracket 23 in which is journaled a longitudinally extending shaft 24 connected by a universal joint 25 to drive the shafting 13 of the grain binder from its rear end, while at its forward end it is connected by a telescopically extensible shaft part 26 through a universal joint 27 to the power take-off shaft 14 of the tractor. The draw frame of the hitch is crossbraced by a longitudinal piece 28 and a transverse piece 29, as shown in Figure 3, the piece 29 supporting a set of binder control levers 30, as shown, for controlling the usual functions of the grain binder, said levers designed to be within reach of the operator on his seat on the tractor.

As the binder is pulled by a tractor, of course, no operator sits on the binder where he can watch the binding mechanism and the twine can source of supply of twine for the binder. It is accordingly desirable that the twine can be located where the operator may watch it from his seat on the tractor. Accordingly, it is proposed to place this twine can on the binder hitch frame where it may be watched by the operator. This improved mounting will now be described. Transversely arranged on the members 17 and 28 is a transverse crank rod 31, which pivotally carries a vertically disposed twine can 32, the crank being hinged to the bottom of the can, as shown in Figure 3. The rear top side of the can has a pivotal link connection 33 with the post 12 on the binder main frame.

Another feature of this invention contemplates the use of a counterbalance means between the binder main frame and the hitch draw frame. This means comprises a spring 34 connected between the post 12 on the binder main frame and the cross piece 22 of the hitch draw frame, as shown. Thus, the spring exerts a force constantly to pull up on the draw frame.

The operation and use of the improved structure of this invention will now be described. The binder hitch draw frame being pivotally connected by the pivots 18 and 20 to the binder main frame, can be manually pushed up to fold the same alongside the binder, upon removal of the vertical pivot pin 21 from the tractor drawbar and disconnection of the telescopic shaft section 26, the hitch then being adapted for movement to the dotted line position shown in Figure 1. A hook 35 always carried by a suitable part of the binder frame is then in position to hook onto any part of the hitch structure, such for example as the control levers 30, to retain the hitch structure in its upwardly folded position. Thus, the binder is materially narrowed for purposes of convenient transport.

The counterbalancing spring 34, of course, exerts a force which materially assists in the raising of the hitch structure and, incidentally, when it is desired to connect the hitch to the tractor drawbar 16 by means of the pin 21, it will be found that the spring resiliently floats the hitch draw frame and makes an easy job of connection of the binder to the tractor, as the operator does not have to lift the whole weight of the binder hitch.

As the hitch is folded upwardly, the twine can 32 maintains its vertical position because of its pivotal mounting on the crank 31 and the rod 33 connecting its top with the post 12, as will be understood.

It is to be understood that in this disclosure there has been shown an illustrative embodiment of one form of this invention which it may assume in practice, and that obviously it may be altered to assume other forms and embody changes in its structure which will not depart from the spirit and scope of this invention. It is the intention to cover all such changes as do not materially depart from the present invention, as indicated in the appended claims.

What we claim is:

1. The combination with a binder having a main frame, of a hitch therefor, said hitch comprising a draw frame pivotally connected to the binder main frame on horizontal pivots and adapted for detachable connection on a vertical pivot to the drawbar of a tractor, and a twine can pivotally connected to and carried by the draw frame.

2. The combination with a binder having a main frame, of a hitch therefor, said hitch comprising a draw frame pivotally connected to the binder main frame on horizontal pivots, a rod on the draw frame, and a twine can pivotally connected to and carried by said rod.

3. The combination with a binder having a main frame, of a hitch therefor, said hitch comprising a draw frame pivotally connected to the binder main frame on horizontal pivots, a rod on the draw frame, a vertically arranged twine can pivotally connected at its bottom to said rod, and a pivotal link connection from the top of the can to the binder main frame.

4. The combination with a binder having a main frame, of a hitch therefor, said hitch comprising a draw frame pivotally connected to the binder main frame whereby said draw frame may be folded upwardly, a vertically disposed twine can mounted on the draw frame, and means connected to the can for maintaining said can in its vertical position when the draw frame is folded.

5. The combination with a binder having a main frame, of a hitch therefor, said hitch comprising a draw frame embodying a pair of forwardly converging members pivotally connected at their rear ends to the binder main frame, whereby said hitch frame may be folded upwardly, a twine can vertically carried on said frame, and means for maintaining said twine can in its vertical position when the hitch frame is folded.

6. The combination with a binder having a main frame, of a hitch therefor, said hitch comprising a draw frame embodying a pair of forwardly converging members pivotally connected at their rear ends to the binder main frame, whereby said hitch frame may be folded upwardly, a transverse rod on the hitch frame members, a vertical twine can pivotally mounted on the rod, a pivoted link connection from the can to the binder main frame, and a counterbalancing connection from the binder main frame to the hitch frame.

7. The combination with a binder having a frame, of a hitch therefor, said hitch being pivotally connected to the frame for upward folding, a twine can mounted on the hitch, and means connected between the can and frame for maintaining the can upright when the hitch is folded.

8. The combination with a binder having a frame, of a hitch therefor, said hitch being pivotally connected to the frame for upward folding, a twine can and binder control levers mounted on the hitch, and means for maintaining the can upright when the hitch is folded.

9. The combination with a binder having a frame including an upright at its front end, a hitch foldably connected to the frame, an upright twine can pivotally mounted on the hitch, and a pivot link connected beween the upright and can to maintain said can in parallelism with the upright when the hitch is folded.

In testimony whereof we affix our signatures.

DANIEL W. SMITH.
WILLIAM WEBBER.